United States Patent
Greenfield et al.

(10) Patent No.: US 10,678,706 B2
(45) Date of Patent: Jun. 9, 2020

(54) CACHE MEMORY WITH SCRUBBER LOGIC

(71) Applicant: INTEL CORPORATION, Santa Clara, CA (US)

(72) Inventors: Zvika Greenfield, Kfar Sava (IL); Eshel Serlin, Hod Hasharon (IL); Asaf Rubinstein, Kefar Sava (IL); Eli Abadi, Petach Tikva (IL)

(73) Assignee: INTEL CORPORATION, Santa Clara, CA (US)

( * ) Notice: Subject to any disclaimer, the term of this patent is extended or adjusted under 35 U.S.C. 154(b) by 128 days.

(21) Appl. No.: 15/920,145

(22) Filed: Mar. 13, 2018

(65) Prior Publication Data

US 2019/0050346 A1 Feb. 14, 2019

Related U.S. Application Data

(60) Provisional application No. 62/536,785, filed on Jul. 25, 2017.

(51) Int. Cl.
| | |
|---|---|
| G06F 12/00 | (2006.01) |
| G06F 13/00 | (2006.01) |
| G06F 13/28 | (2006.01) |
| G06F 12/123 | (2016.01) |
| G06F 12/126 | (2016.01) |
| G06F 11/10 | (2006.01) |
| G06F 12/121 | (2016.01) |

(52) U.S. Cl.
CPC .......... *G06F 12/123* (2013.01); *G06F 12/124* (2013.01); *G06F 12/126* (2013.01); *G06F 11/106* (2013.01); *G06F 12/121* (2013.01); *G06F 2212/1044* (2013.01)

(58) Field of Classification Search
CPC ..... G06F 12/123; G06F 11/106; G06F 12/121
USPC ........................................................ 711/134
See application file for complete search history.

(56) References Cited

U.S. PATENT DOCUMENTS

| | | | |
|---|---|---|---|
| 2003/0084250 A1* | 5/2003 | Gaither | G06F 12/0811 711/133 |
| 2014/0052924 A1* | 2/2014 | Ramaraju | G06F 12/12 711/133 |
| 2014/0281261 A1* | 9/2014 | Vera | G06F 12/126 711/135 |
| 2016/0246734 A1* | 8/2016 | Greenspan | G06F 12/122 |

* cited by examiner

*Primary Examiner* — Edward J Dudek, Jr.
*Assistant Examiner* — Sidney Li
(74) *Attorney, Agent, or Firm* — Schwabe, Williamson & Wyatt, P.C.

(57) ABSTRACT

Embodiments of the present disclosure are directed towards a computing device having a cache memory device with a scrubber logic. In some embodiments, the scrubber logic controller may be coupled with the cache device, and may perform a selection for eviction from the cache device a portion of data stored in the cache device, based at least in part on one or more selection criteria, at a dynamically adjusted level of aggressiveness of the selection performance. The scrubber logic controller may adjust the level of aggressiveness of the selection performance, based at least in part on a determined time left to complete the selection performance at a current level of aggressiveness. Other embodiments may be described and/or claimed.

18 Claims, 5 Drawing Sheets

CACHE MEMORY WITH SCRUBBER LOGIC

CROSS-REFERENCE TO RELATED APPLICATIONS

This application claims priority to the U.S. Provisional application No. 62/536,785 filed on Jul. 25, 2017, the disclosure of which is incorporated herein in its entirety and all purposes.

FIELD

Embodiments of the present disclosure generally relate to the field of memory devices and in particular to cache memory management.

BACKGROUND

Persistent memory may typically be implemented with relatively large and slow non-volatile memory technology. Some current solutions for persistent memory may utilize a backup battery, which may lead to the memory cost increase. Typically, such memory may be accessed through few levels of volatile cache memories in order to maintain desired performance. However, cache memory devices may lose their content, for example, in case of power failure or a processor error. Accordingly, data may be lost in such event in an arbitrary fashion, which may lead to file corruption.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
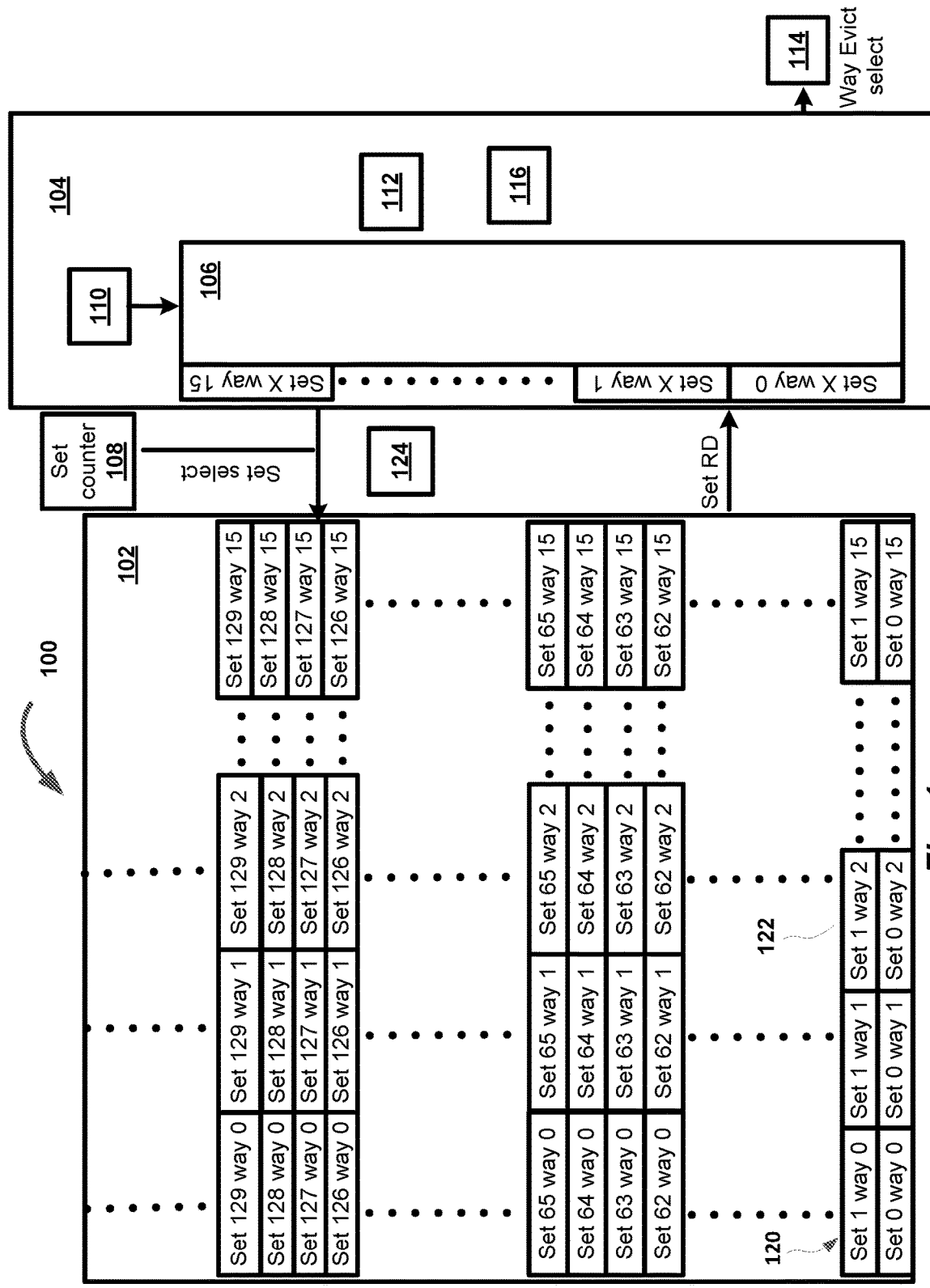
FIG. 1 illustrates an example cache system with a scrubber logic, in accordance with some embodiments.

Embodiments of the present disclosure include techniques and configurations for a computing device having a cache memory device with a scrubber logic. In some embodiments, the scrubber logic controller may be coupled with the cache device, and may perform a selection for eviction from the cache device a portion of data stored in the cache device, based at least in part on one or more selection criteria, at a dynamically adjusted level of aggressiveness of the selection performance. The scrubber logic controller may adjust the level of aggressiveness of the selection performance, based at least in part on a determined time left to complete the selection performance at a current level of aggressiveness.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

FIG. 1 illustrates an example cache system with a scrubber logic, in accordance with some embodiments. The system 100 may include a memory device (e.g., cache device) 102. In some embodiments, the cache device 102 may be associated with a computing system (FIG. 5) and may be configured to store persistent and non-persistent type of data that may also be stored in main memory 114 of the computing system. As shown, the cache device 102 may be configured to store a number of data lines or sets (e.g., 120), wherein each set may have one or more (typically multiple) ways (e.g., 122).

The system 100 may further include a scrubber logic 104 coupled with the cache device 102. For example, the cache device 102 with the scrubber logic 104 may form, or be a part of, a memory system operating in a computer system.

The computer system may be provided according to cache hierarchy, and include main memory that may be non-volatile memory (NVM), such as, for example, 3D XPoint® memory, and cache memory that may be volatile. In conventional solutions, there is a process of replacement and eviction of data from cache to the main memory. However, the time of such process performance may be unpredictable, especially with large cache memory devices.

The purpose of the scrubber logic 104 may be to limit the time during which the persistent data may reach the persistent (e.g., main) memory. In other words, the purpose of the scrubber logic 104 may be to limit the age of data that may be stored in the cache and that may be lost in case of an unexpected event (e.g., power loss). For example, the scrubber logic 104 may provide that selected modified persistent data may reach persistent media (e.g., non-volatile memory of the computer system) within a particular period of time (e.g., one minute). Such data provision to a non-volatile memory within a particular period of time may minimize potential data loss in case of unexpected event. A time period of about one minute may be a reasonable period of time for transferring persistent modified data to a non-volatile memory in computer systems in which a cache memory device having a size of about 8-32 GB is associated with the main memory having a size from 64 GB to multiple TB.

In embodiments, the scrubber logic 104 may be implemented as a combination of firmware and/or software, e.g., as a controller configured to implement scrubbing of the cache in accordance with embodiments described herein. The scrubber logic 104 configured to select for eviction a portion of data stored in the cache device 102, based at least in part on one or more criteria. In embodiments, the scrubber logic 104 may include, for example, a state machine 106 that may scan the cache device 102, e.g., set by set and way by way, e.g., with a set counter 108 providing a signal Set select to the cache device 102. In response, the cache device 102 may return the selected set (Set read). The scrubber logic 104 may identify portions of data (sets, ways) that may be persistent and modified. Every identified persistent modified portion of data (set or way) may be selected for eviction (M→E) according to one or more criteria. The selected for eviction data may be written into non-volatile main memory 114 of the computer system.

The criteria may refer to persistent modified data and may include, for example, age of the data, such as least recently used (LRU), most recently used (MRU), or other age-defining parameters, and may also cause to identify a number of persistent modified ways occupied in the selected set.

The scrubber logic 104 may include a scrubber control register 110 that may control (e.g., dynamically adjust) the aggressiveness of the scrubber logic 104 in at least two dimensions: scrubber operation frequency (e.g., speed of scanning of the cache device 102), and aggressiveness of the application of criteria. The aggressiveness levels may include different definitions and are described below in greater detail. The scrubber control register 110 may be implemented as firmware or a combination of software and firmware to manage the scrubber aggressiveness.

The scrubber logic 104 may further include a status register 112 that may indicate the total number of modified persistent data portions (e.g., lines or sets) in the memory device (cache device) 102.

The levels of aggressiveness of the scrubber logic 102 may be based on an age of data to be cleaned/evicted and may include: cleaning least recently used persistent (LRUP) data; slow cleaning, including cleaning the LRUP data and at least one portion of most recently used (MRU) persistent data; full cleaning, including cleaning of all persistent data; and cleaning all persistent data and returning to LRUP cleaning after completion of an iteration of the cleaning of all persistent data. In some embodiments, cleaning LRUP data may be used as a lowest level of aggressiveness, and full cleaning and return to LRUP cleaning may serve as a highest level of aggressiveness. However, these levels may be attributed to the lowest and highest levels of aggressiveness as an example, by way of illustration. It will be appreciated that there may be many different modes that affect the aggressiveness of the scrubber logic.

In embodiments, the scrubber logic 102 may include a processor 116, to control and operate the components of scrubber logic 102 described above.

In some embodiments, the system 100 may include a timer 124, which may be a standalone device, and may be configured to start iterations of read set and select data for eviction operation (described below in greater detail).

Figure 2:
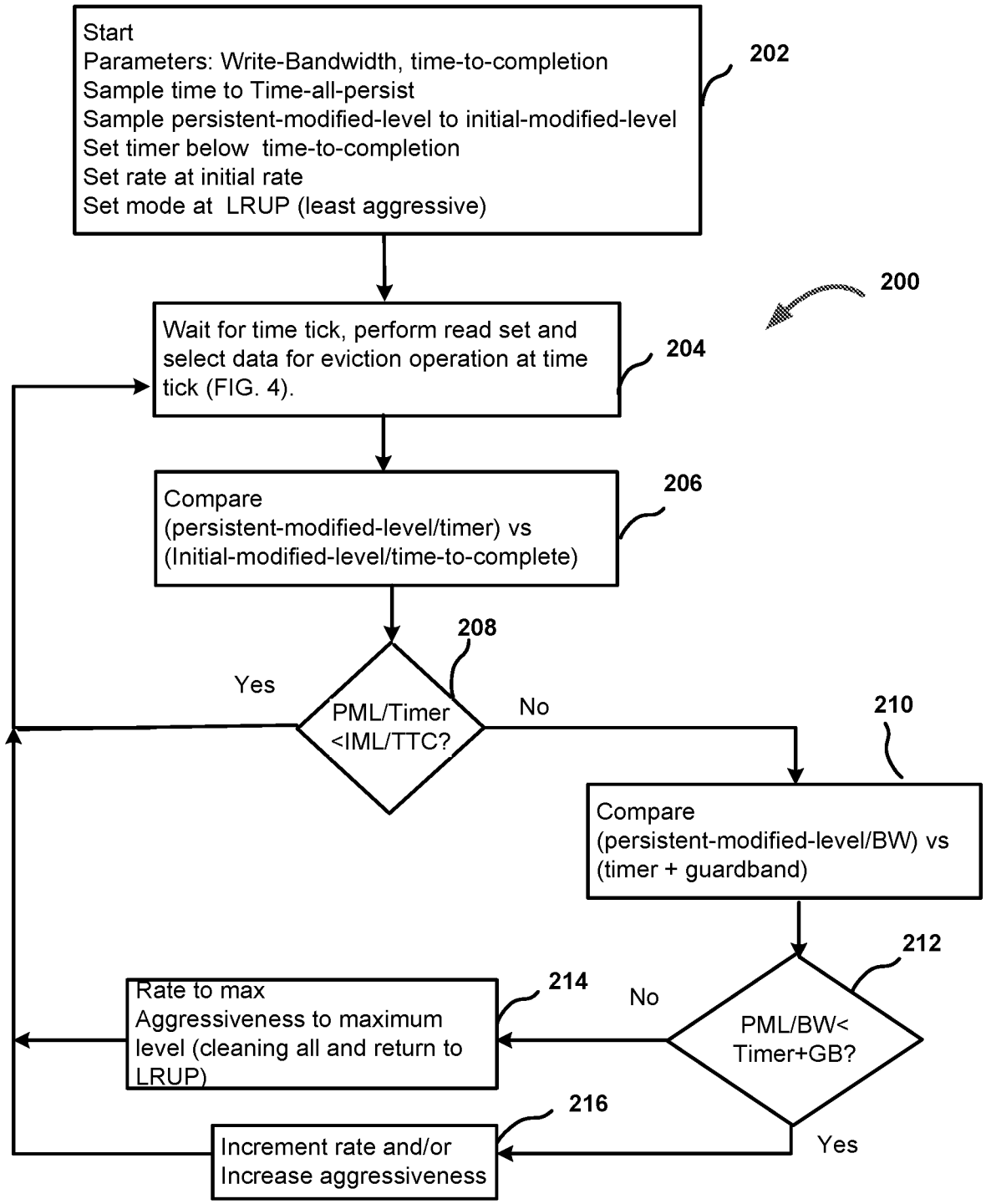
FIG. 2 is a flow diagram illustrating an example process of operation of a scrubber logic associated with a memory device of a cache system, in accordance with some embodiments.

FIG. 2 is a flow diagram illustrating an example process of operation of a scrubber logic associated with a memory device of a cache system, in accordance with some embodiments. More specifically, the process 200 illustrates the time management and aggressiveness management of the scrubber logic described in reference to FIG. 1.

The process 200 may start at block 202 and include setting the scrubber logic parameters. The parameters may include, for example, write bandwidth and time to completion. The time to completion may indicate the time to complete the scanning of the cache device 102 by the scrubber logic 104 (FIG. 1). The sample time may be set to time-all-persist. The time-all-persist is the time during which the data may be modified before it is submitted to persistent memory. In other words, the time-all-persist is the time at which the procedure has started and completed. The time-all-persist may be reported to the operating system.

The sample persistent modified level (e.g., how much persistent modified data is stored in the cache) may be set to initial modified level (sampled at the beginning of the process).

The timer (e.g., 124 of FIG. 1) may be set to time to completion. Time to completion may indicate a time to fully scan the cache memory with the scrubber logic. The time to completion may be a "worst-case" estimate of when the current procedure may be completed, and it may be calculated by the amount of modified data divided by bandwidth.

The rate (e.g., speed of scanning, controlled by the counter 108 and/or timer 124) may be set to initial value. The mode (e.g., initial aggressiveness level) may be set to least aggressive (LRUP).

Figure 4:
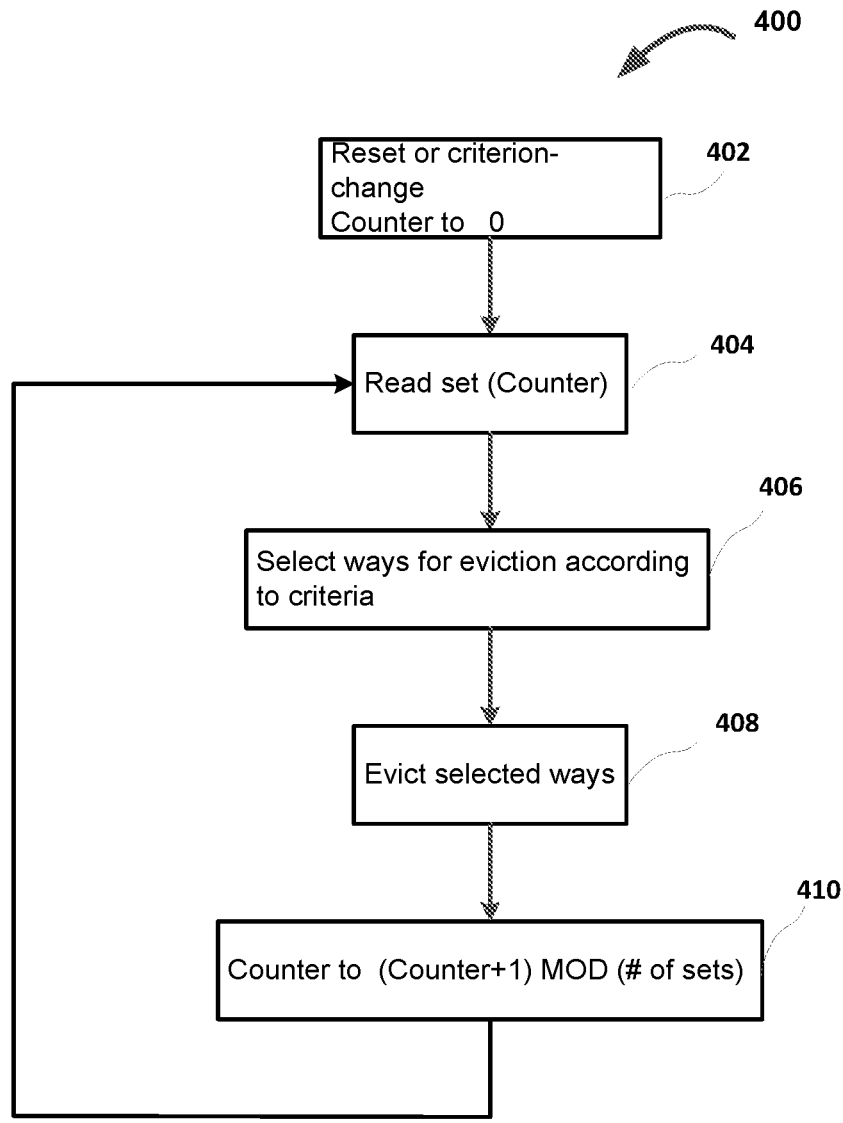
FIG. 4 is a flow diagram illustrating an example process of operation of a scrubber logic associated with a memory device of a cache system, in accordance with some embodiments.

At block 204, the process 200 may include, at time tick initiated by the timer 124, performing reading of a set and selecting data for eviction in the set, if any (as described in detail in FIG. 4). It should be noted that the process of block 204 (FIG. 4) may occur continuously between time ticks initiated by the timer 124.

At block 206, the process 200 may include dynamically adjusting a pace of scanning of the memory device (cache) 102. This may be achieved by comparing persistent-modified-level of the data divided by timer count (PML/Timer) with initial modified level of the data divided by time to complete (IML/TTC). Specifically, persistent modified level may indicate how much persistent modified data is being stored in the cache memory. Initial modified level may indicate how much persistent modified data was stored in the cache initially. In other words, the above computation may be performed to make sure that the process 200 is on track for completion and whether the process execution speed may be increased by increasing aggressiveness level.

At decision block 208, it may be determined whether there is enough time for the process 200 to complete the scanning of the memory device (cache) 102. For example, if it is determined that the PML/Timer is less than IML/TTC, the process 200 may return to 204 and the scanning may continue. If it is determined that the PML/Timer is equal to or greater than IML/TTC, the process 200 may move to block 210.

At block 210, the process 200 may include comparing persistent-modified-level divided by bandwidth (PML/BW) with timer+guardband (Timer+GB). Guardband may be a margin of time allowed for the process 200 to complete.

At decision block 212, if it is determined that the PML/BW is equal or greater than Timer+GB, the process 200 may move to block 214.

At block 214, the process 200 may include adjusting the rate to maximum value, and/or adjusting aggressiveness level (e.g., raising the level to cleaning all data and returning to LRUP). In other words, PML/BW equal or greater than Timer+GB may indicate that the process 200 may not have enough time to complete at existing rate, and the rate and aggressiveness level may need to be adjusted to their maximum levels in order for the process 200 to complete. If it is determined that the PML/BW is less than Timer+GB, the process 200 may move to block 216.

At block 216, the process 200 may include incrementing the rate and/or increasing aggressiveness to a next level. The rate may control the start of iteration of block 204 (described in FIG. 4). Accordingly, the level of aggressiveness (and/or rate) of the scrubber logic may be dynamically adjusted by the process 200.

Figure 3:
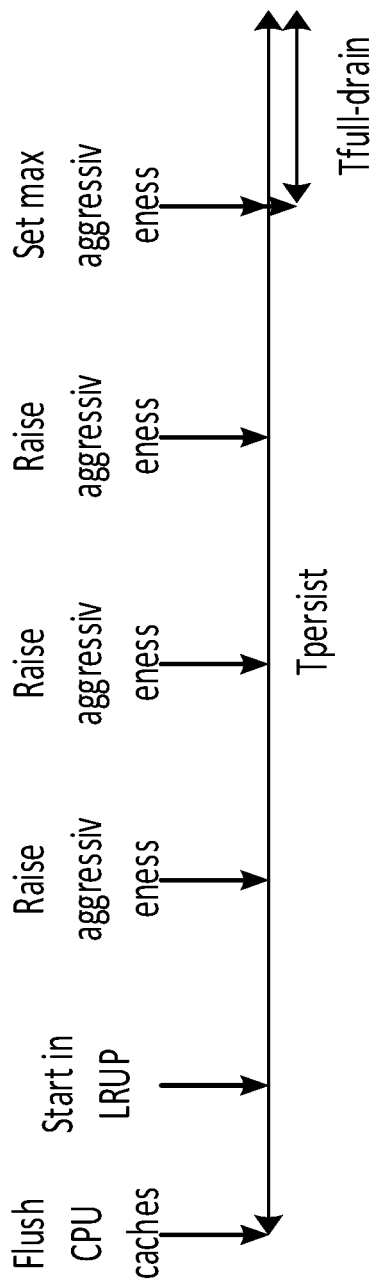
FIG. 3 is an example time scale of the process of FIG. 2, in accordance with some embodiments.

FIG. 3 is an example time scale of the process of FIG. 2, in accordance with some embodiments. As shown, the process of FIG. 2 may run in iterations of time constant Tpersist, where 2*Tpersist is the maximum time from data modification to the data update in far memory (FM). The process may start with cleaning the cache memory (e.g., one or more or all central processing unit (CPU) caches), and proceed at the lowest aggressiveness level (LRUP). Over the iteration of cache scanning, e.g., during the time Tpersist the aggressiveness level may be repeatedly adjusted (e.g., raised). For example the aggressiveness level may be raised to its maximum level when there is enough time left to complete the iteration in the maximum aggressiveness level. The time left (indicated as "Tfull-drain") may be calculated according to the memory write bandwidth and level of persistent-modified data in the cache. When this iteration is completed the modified data may be in the cache, but that data may never be older than Tpersist. Until this data is updated, another time period smaller than Tpersist may pass, so the maximum age of data may reach about 2*Tpersist.

FIG. 4 is a flow diagram illustrating an example process of operation of a scrubber logic associated with a memory device of a cache system, in accordance with some embodiments. More specifically, the process 400 illustrates a selection of a portion of data for eviction by the scrubber logic at the scanning of the memory device (e.g., cache) described in reference to FIGS. 1-3, and more specifically, at block 204 of FIG. 2.

The process 400 may begin at block 402 and include setting or resetting the criteria for selection of the data to be evicted, and setting the counter of the scrubber logic to zero.

At block 404, the process 400 may include reading a data portion (e.g., a set) from the memory (cache device 102 of FIG. 1).

At block 406, the process 400 may include selecting for eviction one or more subsets of data in the portion of data according to the one or more criteria. For example, one or more ways in the set may be selected for eviction. As described above, the portion of data may be determined to be persistent and modified, and selection for eviction may be based on one or more criteria (e.g., LRUP).

At block 408, the process 400 may include evicting selected subsets of data (ways). As described above, eviction may include writing the selected one or more subsets of data into a main memory associated with the memory system including the cache and scrubber.

At block 410, the process 400 may include updating the counter (e.g., setting the counter to a new value, e.g., (counter+1) MOD (number of sets), and returning to block 404.

Figure 5:
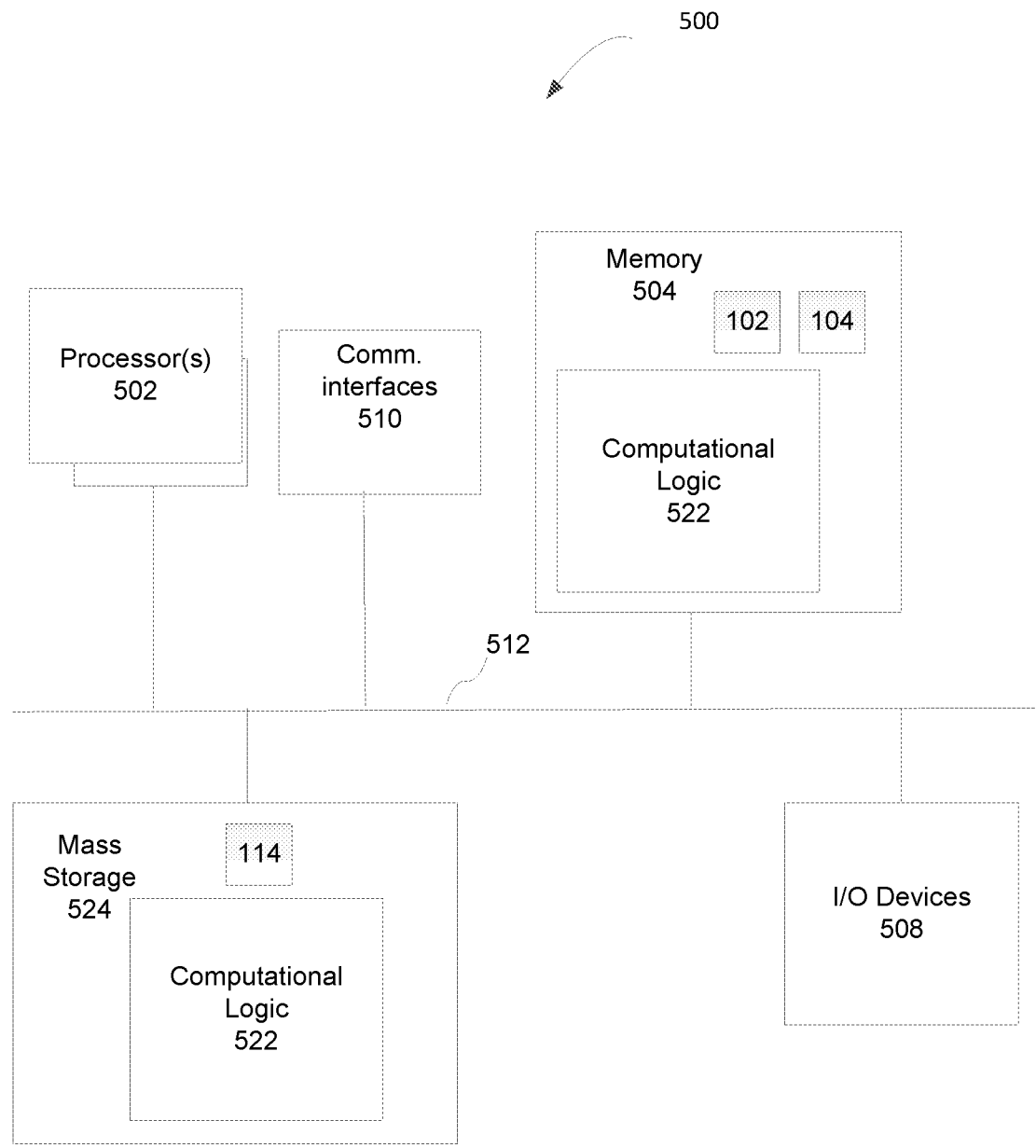
FIG. 5 illustrates an example computing system suitable for use with cache memory with a scrubber logic, in accordance with some embodiments.

FIG. 5 illustrates an example computing system suitable for use with cache memory with a scrubber logic, in accordance with some embodiments. In some embodiments, example computing system 500 may include various components described in reference to FIG. 1, such as, for example, the memory device (cache) 102 and the scrubber logic (e.g., controller) 104.

As shown, computing system 500 may include one or more processors or processor cores 502 and system memory 504. For the purpose of this application, including the claims, the terms "processor" and "processor cores" may be considered synonymous, unless the context clearly requires otherwise. The processor 502 may include any type of processors, such as a central processing unit (CPU), a microprocessor, and the like. The processor 502 may be implemented as an integrated circuit having multi-cores, e.g., a multi-core microprocessor.

The computing system 500 may include mass storage devices 524 (indicated in FIG. 1 as 114, such as solid state drives, volatile memory (e.g., dynamic random-access memory (DRAM), and so forth)). In general, system memory 504 and/or mass storage devices 524 may be temporal and/or persistent storage of any type, including, but not limited to, volatile and non-volatile memory, optical, magnetic, and/or solid state mass storage, and so forth. The persistent memory may be coupled with a scrubber in accordance with embodiments described herein. Volatile memory may include, but is not limited to, static and/or dynamic random-access memory. Non-volatile memory may include, but is not limited to, electrically erasable programmable read-only memory, phase change memory, resistive memory, and so forth.

The computing system 500 may further include input/output (I/O) devices 508 (such as display, soft keyboard, touch sensitive screen, image capture device, and so forth) and communication interfaces 510 (such as network interface cards, modems, infrared receivers, radio receivers (e.g., Near Field Communication (NFC), Bluetooth, WiFi, 4G/5G Long Term Evolution (LTE), and so forth).

The communication interfaces 510 may include communication chips (not shown) that may be configured to operate the device 500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 510 may operate in accordance with other wireless protocols in other embodiments.

The above-described computing system 500 elements may be coupled to each other via system bus 512, which may represent one or more buses. In the case of multiple buses, they may be bridged by one or more bus bridges (not shown). Each of these elements may perform its conventional functions known in the art. In particular, system memory 504 and mass storage devices 524 may be employed to store a working copy and a permanent copy of the programming instructions implementing firmware, an operating system and/or one or more applications to be executed on computing system. In embodiments, the system memory 504 may include the memory device (cache) 102 and the scrubber 104 of FIG. 1.

Computational logic 522 may be implemented in assembler instructions supported by processor(s) 502 or high-level languages that may be compiled into such instructions.

The number, capability, and/or capacity of the elements 502, 510, 512 may vary, depending on whether computing system 500 is used as a mobile computing system, such as a tablet computing system, laptop computer, game console, or smartphone, or a stationary computing system, such as a set-top box or desktop computer. Their constitutions are otherwise known, and accordingly will not be further described.

At least one of processors 502 may be packaged together with memory having computational logic 522 to form a System in Package (SiP) or a System on Chip (SoC). In various implementations, the computing system 500 may comprise a mobile computing system, such as a smartphone, a tablet, a personal digital assistant (PDA), an ultra mobile PC, or any other mobile computing system. In various embodiments, the computing system may comprise a laptop, a netbook, a notebook, or an ultrabook. In further implementations, the computing system 500 may be any other electronic device that processes data.

According to various embodiments, the present disclosure describes a number of examples.

Example 1 may be a computing device, comprising: a cache device to store data; and a scrubber logic controller coupled with the cache device, to perform a selection for eviction from the cache device a portion of data stored in the cache device, based at least in part on one or more selection criteria, at a dynamically adjusted level of aggressiveness of the selection performance.

Example 2 may include the computing device of Example 1, wherein to perform a selection for eviction a portion of data, the scrubber logic controller is to: scan the data stored in the cache device, identify a set of data that comprises persistent and modified data, and select for eviction from the cache device one or more subsets of data in the set of data according to the one or more selection criteria.

Example 3 may include the computing device of Example 2, wherein the scrubber logic controller is to write the selected one or more subsets of data into a main memory associated with the computing device.

Example 4 may include the computing device of Example 2, wherein the one or more subsets of data comprise one or more ways.

Example 5 may include the computing device of Example 4, wherein the scrubber logic controller is to indicate a total number of the modified persistent sets of the stored data in the cache device.

Example 6 may include the computing device of Example 1, wherein the one or more selection criteria are based at least in part on an age of data.

Example 7 may include the computing device of any Examples 1 to 6, wherein the scrubber logic controller is to adjust the level of aggressiveness of the selection performance, based at least in part on a time left to complete the selection performance at a current level of aggressiveness.

Example 8 may include the computing device of Example 7, wherein the level of aggressiveness is selected from at least one of: cleaning least recently used persistent (LRUP) data; slow cleaning most recently used (MRU) data, including cleaning the LRUP data and at least one portion MRU persistent data; full cleaning, including cleaning all persistent data; and full and return cleaning, including cleaning all persistent data and returning to LRUP after completion of an iteration of the cleaning of all persistent data.

Example 9 may include the computing device of Example 2, wherein the scrubber logic controller is to adjust a rate of scanning of the cache device.

Example 10 may be a scrubber logic controller, to perform a selection for eviction from a cache device, coupled with the scrubber logic controller, a portion of data stored in the cache device, wherein the scrubber logic controller includes: a processor; a state machine operated by the processor to scan the cache device; identify a set of data stored in the cache device, wherein the identified set of data comprises persistent and modified data; and select for eviction from the cache device one or more subsets of data in the set of data according to one or more selection criteria; and a control register coupled with the state machine to dynamically adjust a level of aggressiveness of the performance of selection for eviction.

Example 11 may include the scrubber logic controller of Example 10, wherein the control register is to dynamically adjust the level of aggressiveness of the selection performance based at least in part on a time left to complete the selection performance at a current level of aggressiveness.

Example 12 may include the scrubber logic controller of Example 11, wherein to dynamically adjust the level of aggressiveness includes to determine a level of persistent modified data stored in the cache device, and increase the level of aggressiveness based on a result of the determination.

Example 13 may include the scrubber logic controller of Example 10, wherein the level of aggressiveness is selected from at least one of: cleaning least recently used persistent (LRUP) data; slow cleaning most recently used (MRU) data, including cleaning the LRUP data and at least one portion MRU persistent data; full cleaning, including cleaning all persistent data; and full and return cleaning, including cleaning all persistent data and returning to LRUP after completion of an iteration of the cleaning of all persistent data.

Example 14 may include the scrubber logic controller of Example 10, wherein to perform a selection for eviction further includes to adjust a rate of scanning of the cache device.

Example 15 may include the scrubber logic controller of any Examples 10 to 14, wherein the scrubber logic controller is to write the selected one or more subsets of data into a main memory associated with the computing device.

Example 16 may be a method, comprising: scanning, by a scrubber logic controller coupled with a cache device of a computing device, a data stored in the cache device; identifying, by the scrubber logic controller, a set of data that comprises persistent and modified data; selecting for eviction from the cache device, by the scrubber logic controller, one or more subsets of data in the set of data according to the one or more selection criteria; and adjusting, by the scrubber logic controller, a level of aggressiveness at which the scanning, identifying, and adjusting are performed.

Example 17 may include the method of Example 16, wherein adjusting a level of aggressiveness at which the scanning, identifying, and adjusting are performed includes: determining, by the scrubber logic controller, a time left to complete the scanning, identifying, and adjusting at a current level of aggressiveness; identifying, by the scrubber logic controller, a level of persistent modified data stored in the cache device; and increasing, by the scrubber logic controller, the level of aggressiveness based at least in part on a result of the determining and identifying.

Example 18 may include the method of Example 17, further comprising: adjusting, by the scrubber logic controller, a rate of scanning of the cache device, based at least in part on the result of the determining and identifying.

Example 19 may include the method of Example 16, further comprising: providing, by the scrubber logic controller, the selected one or more subsets of data into a main memory associated with the computing device.

Example 20 may include the method of any Examples 16 to 19, wherein the level of aggressiveness is selected from at least one of: cleaning least recently used persistent (LRUP) data; slow cleaning most recently used (MRU) data, including cleaning the LRUP data and at least one portion MRU persistent data; full cleaning, including cleaning all persistent data; and full and return cleaning, including cleaning all persistent data and returning to LRUP after completion of an iteration of the cleaning of all persistent data.

Various operations are described as multiple discrete operations in turn, in a manner that is most helpful in understanding the claimed subject matter. However, the order of description should not be construed as to imply that these operations are necessarily order dependent.

Embodiments of the present disclosure may be implemented into a system using any suitable hardware and/or software to configure as desired. Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims, which are to be construed in accordance with established doctrines of claim interpretation, and the equivalents thereof

What is claimed is:

1. A computing device, comprising:
   a cache device to store data; and
   a scrubber logic controller coupled with the cache device, to perform a selection for eviction from the cache device a portion of data stored in the cache device, based at least in part on one or more selection criteria, at a dynamically adjusted level of aggressiveness of the selection for eviction,
   wherein to dynamically adjust a level of aggressiveness of the selection for eviction, the controller is to:
   determine a time left to complete a scanning of the cache device, to perform the selection for eviction at a current level of aggressiveness, based at least in part on a comparison of a volume of persistent-modified data stored in the cache device at a time of the scanning divided by a scrubber logic timer count, with a volume of persistent-modified data stored in the cache device before the scanning, divided by a predetermined time to complete the scanning; and
   adjust the level of aggressiveness, based at least in part on a result of the comparison.

2. The computing device of claim 1, wherein to perform the selection for eviction a portion of data, the scrubber logic controller is to: scan the data stored in the cache device, identify a set of data that comprises persistent and modified data, and select for eviction from the cache device one or more subsets of data in the set of data according to the one or more selection criteria.

3. The computing device of claim 2, wherein the scrubber logic controller is to write the selected one or more subsets of data into a main memory associated with the computing device.

4. The computing device of claim 2, wherein the one or more subsets of data comprise one or more ways.

5. The computing device of claim 4, wherein the scrubber logic controller is to indicate a total number of the modified persistent sets of the stored data in the cache device.

6. The computing device of claim 1, wherein the one or more selection criteria are based at least in part on an age of data.

7. The computing device of claim 1, wherein the level of aggressiveness is selected from at least one of:
   cleaning least recently used persistent (LRUP) data;
   slow cleaning most recently used (MRU) data, including cleaning the LRUP data and at least one portion of MRU persistent data;
   full cleaning, including cleaning all persistent data; and
   full and return cleaning, including cleaning all persistent data and returning to LRUP after completion of an iteration of the cleaning of all persistent data.

8. The computing device of claim 2, wherein the scrubber logic controller is to adjust a rate of scanning of the cache device.

9. A scrubber logic controller, to perform a selection for eviction from a cache device, coupled with the scrubber logic controller, a portion of data stored in the cache device, wherein the scrubber logic controller includes:
   a processor;
   a state machine operated by the processor to scan the cache device; identify a set of data stored in the cache device, wherein the identified set of data comprises persistent and modified data; and select for eviction from the cache device one or more subsets of data in the set of data according to one or more selection criteria; and
   a control register coupled with the state machine to dynamically adjust a level of aggressiveness of the performance of selection for eviction, which includes to:
   determine a time left to complete a scanning of the cache device, to perform the selection for eviction at a current level of aggressiveness, based at least in part on a comparison of a volume of persistent-modified data stored in the cache device at a time of the scanning divided by a scrubber logic timer count, with a volume of persistent-modified data stored in the cache device before the scanning, divided by a predetermined time to complete the scanning; and adjust the level of aggressiveness, based at least in part on a result of the comparison.

10. The scrubber logic controller of claim 9, wherein to dynamically adjust the level of aggressiveness includes to determine the volume of persistent modified data stored in the cache device.

11. The scrubber logic controller of claim 9, wherein the level of aggressiveness is selected from at least one of:

cleaning least recently used persistent (LRUP) data;

slow cleaning most recently used (MRU) data, including cleaning the LRUP data and at least one portion of MRU persistent data;

full cleaning, including cleaning all persistent data; and full and return cleaning, including cleaning all persistent data and returning to LRUP after completion of an iteration of the cleaning of all persistent data.

12. The scrubber logic controller of claim 9, wherein to perform a selection for eviction further includes to adjust a rate of scanning of the cache device.

13. The scrubber logic controller of claim 9, wherein the scrubber logic controller is to write the selected one or more subsets of data into a main memory associated with a computing device.

14. A method, comprising:

scanning, by a scrubber logic controller coupled with a cache device of a computing device, a data stored in the cache device;

identifying, by the scrubber logic controller, a set of data that comprises persistent and modified data;

selecting for eviction from the cache device, by the scrubber logic controller, one or more subsets of data in the set of data according to one or more selection criteria; and adjusting, by the scrubber logic controller, a level of aggressiveness at which the scanning, identifying, and selecting are performed, including:

determining a time left to complete a scanning of the cache device, to perform the selection for eviction at a current level of aggressiveness, based at least in part on comparing a volume of persistent-modified data stored in the cache device at a time of the scanning divided by a scrubber logic timer count, with a volume of persistent-modified data stored in the cache device before the scanning, divided by a predetermined time to complete the scanning; and adjusting the level of aggressiveness, based at least in part on a result of the comparing.

15. The method of claim 14, wherein adjusting a level of aggressiveness at which the scanning, identifying, and adjusting are performed includes:

identifying, by the scrubber logic controller, the volume of persistent modified data stored in the cache device.

16. The method of claim 15, further comprising:

adjusting, by the scrubber logic controller, a rate of scanning of the cache device.

17. The method of claim 14, further comprising:

providing, by the scrubber logic controller, the selected one or more subsets of data into a main memory associated with the computing device.

18. The method of claim 14, wherein the level of aggressiveness is selected from at least one of:

cleaning least recently used persistent (LRUP) data;

slow cleaning most recently used (MRU) data, including cleaning the LRUP data and at least one portion of MRU persistent data;

full cleaning, including cleaning all persistent data; and full and return cleaning, including cleaning all persistent data and returning to LRUP after completion of an iteration of the cleaning of all persistent data.

\* \* \* \* \*